United States Patent [19]

Armbruster

[11] Patent Number: 4,570,884

[45] Date of Patent: Feb. 18, 1986

[54] COMMUNICATION CABLE SUPPORT SYSTEM

[75] Inventor: George E. Armbruster, Park Ridge, Ill.

[73] Assignee: Illinois Bell Telephone Company, Chicago, Ill.

[21] Appl. No.: 554,182

[22] Filed: Nov. 22, 1983

[51] Int. Cl.[4] ............................................. F16L 3/08
[52] U.S. Cl. ................................ 248/68.1; 248/218.4
[58] Field of Search ....................... 248/68, 60, 61, 62, 248/65, 218.4, 219.1, 74.4, 70, 58, 72, 68.1

[56] References Cited

U.S. PATENT DOCUMENTS

| | | | |
|---|---|---|---|
| 1,093,235 | 4/1914 | Alvord | 248/62 |
| 1,754,924 | 4/1930 | Williams | 248/74.4 |
| 2,504,360 | 4/1950 | Auken | 248/61 |
| 3,233,853 | 2/1966 | Majewski | 248/219.1 |
| 3,333,804 | 8/1967 | James | 248/61 |
| 4,498,651 | 2/1985 | Allen | 248/65 |

FOREIGN PATENT DOCUMENTS

| | | | |
|---|---|---|---|
| 525850 | 6/1956 | Canada | 248/218.4 |
| 1074461 | 10/1954 | France | 248/219.1 |
| 7300 | of 1913 | United Kingdom | 248/74 |

OTHER PUBLICATIONS

Manual of Construction Procedures, Printed by American Tone & Telegraph Company, 1983, Manual #500-701.

Primary Examiner—Reinaldo P. Machado
Assistant Examiner—Alvin Chin-Shue
Attorney, Agent, or Firm—Willian Brinks Olds Hofer Gilson & Lione Ltd.

[57] ABSTRACT

A mounting system for an additional communication cable on a utility pole is described. This mounting system includes a support arm which bolts to a through bolt that extends through the utility pole and is used to mount a pre-existing communication cable. A strand clamp is mounted to the outer end of the support arm, and the strand clamp serves to support a strand and a communication cable such as a CATV cable in the conventional manner. If desired, a diagonal reinforcing strap can be provided between the pole and the support arm. By using a single through bolt to mount both the strand clamp for the existing communication cable and the support arm, clearance and interference problems are minimized and installation costs are reduced.

3 Claims, 4 Drawing Figures

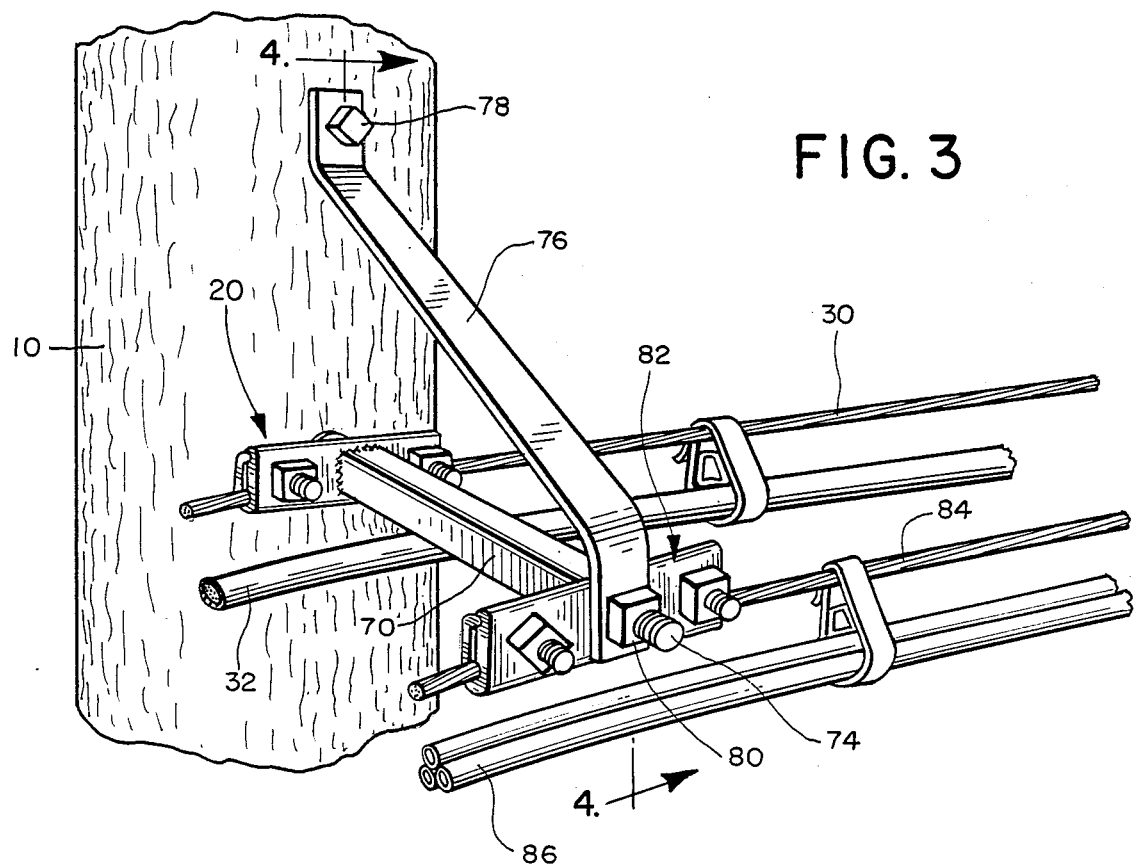
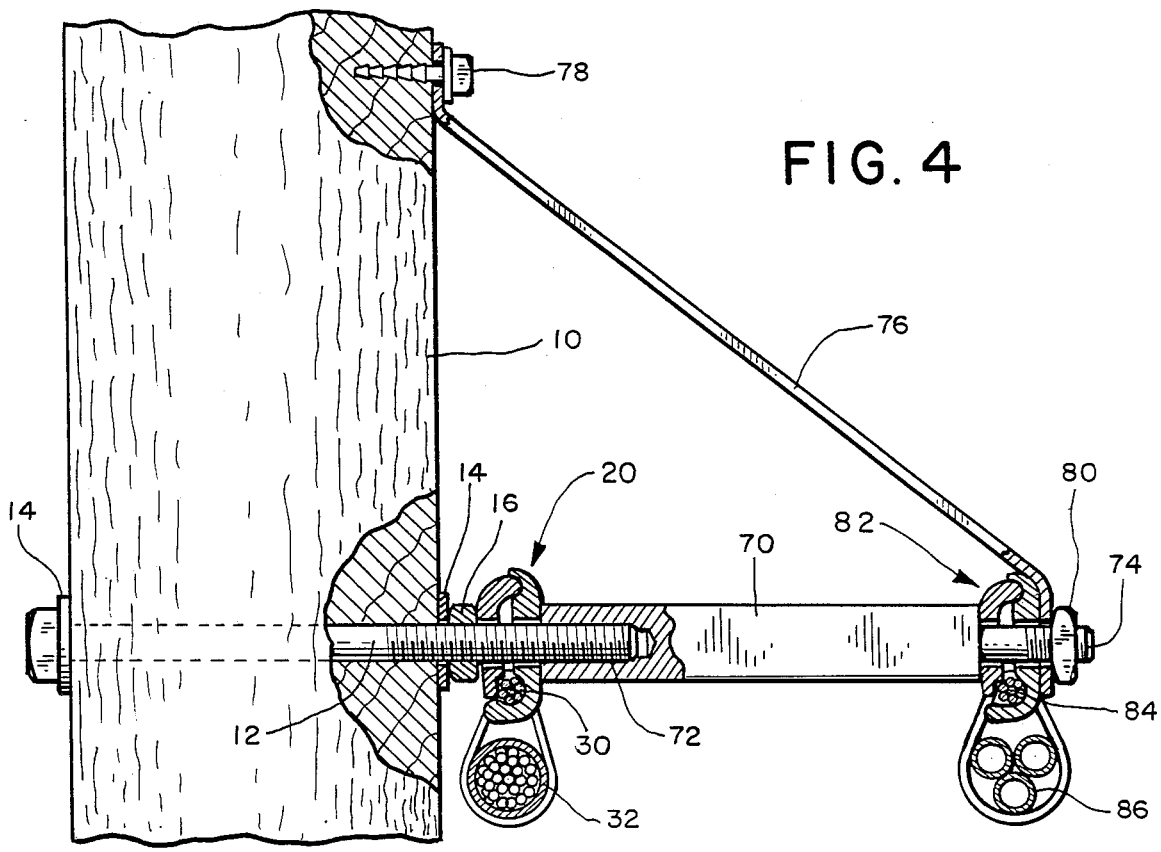

COMMUNICATION CABLE SUPPORT SYSTEM

BACKGROUND OF THE INVENTION

The present invention is directed to a system for supporting an additional communication cable on a support pole, such as a utility pole, which serves to support a pre-existing communication cable.

With the advent of cable TV systems, a significant problem has arisen with regard to the routing of CATV cables. In many communities, a network of utility poles which support both power cables and telephone cables is already in place. In such situations, it is generally desirable to mount CATV cables on pre-existing utility poles. However, the addition of a second communication cable such as a CATV cable may require significant rerouting and repositioning of presently existing communication cables.

For example, in many communities it is standard practice to require a neutral zone of, for example, 40 inches between the power zone on the utility pole which is dedicated to power cables, and the communication zone on the utility pole which is dedicated to communication cables. In addition, many communities have minimum clearance requirements, below which cables cannot be mounted. Thus, in mounting an additional CATV cable, it is often important not to encroach on the neutral zone while preserving adequate ground clearance. Furthermore, in many cases it is desirable that all this be accomplished without interfering with vertical access to the pre-existing communication cable from below. In addition, it is important to minimize the cost of installing an additional communication cable such as a CATV cable by minimizing installation time and hardware requirements.

In the past, one approach to the mounting of a CATV cable to a utility pole was simply to mount the CATV cable on the pole using standard communication cable mounting hardware. When this is done, it may be necessary to reroute the pre-existing telephone cable to maintain the required neutral zone between the communication cables and the power cables. Such rerouting of the telephone cable may in an extreme case require replacement of an entire utility pole, as for example in a situation where clearance requirements do not allow the telephone cable to be lowered on the existing utility pole.

A second prior art approach has been to use an extension arm which is mounted to the utility pole above the telephone cables and extends outwardly and downwardly from the pole in a diagonal direction. The CATV cable is then secured to the lower outer end of this extension arm.

A significant drawback of such prior art extension arms is that the upper ends of these arms are fastened separately onto the utility pole and thus may encroach into the neutral zone of the utility pole. In situations where it is undesirable to have any substantial portion of the communication cable mounting system intruding into the neutral zone, the use of such extension arms may well require that pre-existing telephone cables be lowered on the utility pole to make room for the extension arm mounting. Another drawback with this prior art extension arm is that it is mounted to the utility pole separately from any pre-existing communication cables, and therefore steps must be taken in many cases to electrically interconnect the strands used to support the CATV cable and the pre-existing telephone cable. Such electrical interconnection is often required at rather close spacings, thereby increasing installation costs of the CATV cable.

SUMMARY OF THE INVENTION

The present invention is directed to an improved system for mounting an additional communication cable to a utility pole which mounts a pre-existing communication cable. The system of this invention substantially eliminates the need for rerouting existing communication cables, while minimizing intrusion into the neutral zone of the utility pole.

According to this invention, a mounting system for an additional communication cable is provided in combination with a cable support pole (such as a utility pole) of the type comprising a fastener and first means, coupled to the pole by the fastener, for securing a pre-existing communication cable (such as a telephone cable) to the pole. The system of this invention includes a support bar which is mounted to the cable support pole by the fastener. This support bar is oriented so as not to extend substantially above the first means. In addition, second means are provided, mounted to the support bar, for securing an additional communication cable to the support bar such that the additional communication cable is laterally offset with respect to the pre-existing communication cable, and it is positioned at a level substantially no higher than that of the pre-existing communication cable. In the presently preferred embodiments of this invention a brace is provided which extends diagonally between the pole and a portion of the support bar spaced from the pole.

The present invention provides the important advantage that the same fastener is used both to mount the support bar to the utility pole and to mount the first means for securing the pre-existing communication cable to the pole. For this reason, the support bar can be mounted at a level no higher than that of the fastener, without interfering in any way with the pre-existing communication cable, and without interfering with replacement or repair of the pre-existing communication cable from below. Furthermore, the system of this invention minimizes installation expenses in that no additional fasteners extending through the utility pole need be installed. In addition, since the support bar is mounted at a level no higher than that of the fastener, the system of this invention intrudes into the neutral zone to a minimal extent, and thereby substantially reduces or eliminates the need to reposition pre-existing communication cables on the utility pole.

The invention itself, together with further objects and attendant advantages, will best be understood by reference to the following detailed description, taken in conjunction with the accompanying drawings.

BRIEF DESCRIPTION OF THE DRAWINGS

FIG. 3 is a perspective view of a utility pole on which is mounted a second preferred embodiment of this invention.

FIG. 4 is a sectional view taken along line 4—4 of FIG. 3.

DETAILED DESCRIPTION OF THE PRESENTLY PREFERRED EMBODIMENTS

Figure 1:
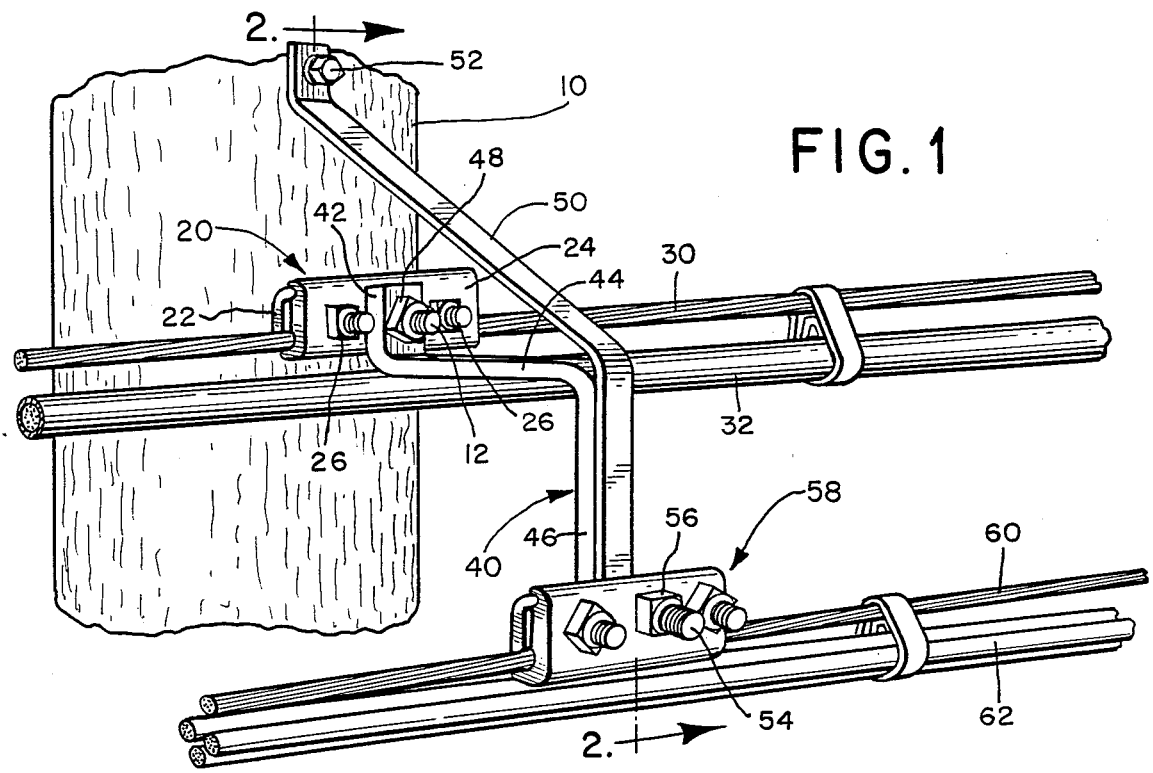
FIG. 1 is a perspective view of a utility pole on which is mounted a first preferred embodiment of this invention.
Figure 2:
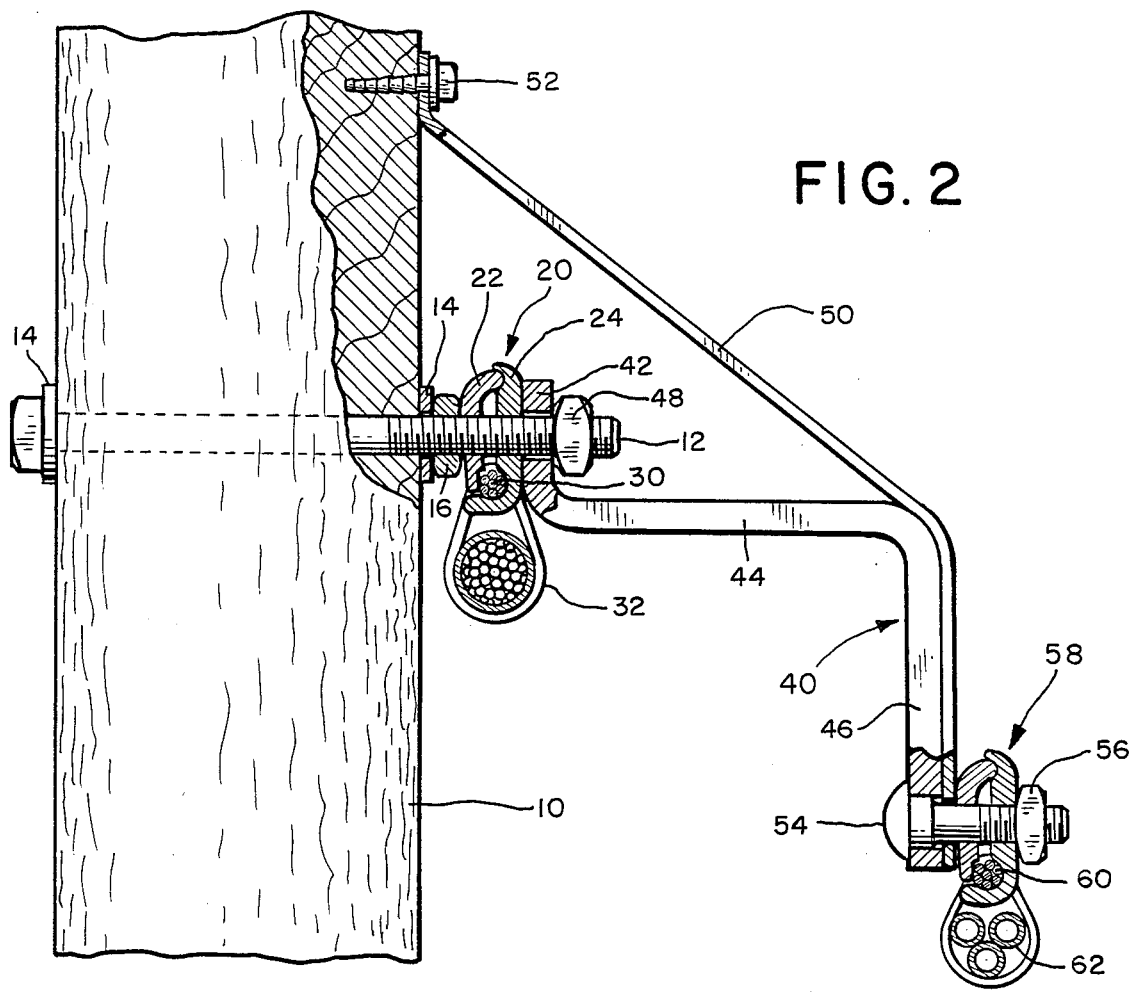
FIG. 2 is a sectional view taken along line 2—2 of FIG. 1.

Turning now to the drawings, FIGS. 1 and 2 show two views of a first preferred embodiment of this invention, and FIGS. 3 and 4 show two views of a second preferred embodiment of this invention. In the following discussion, reference numerals 10-32 will be used to refer to standard, prior art elements typically used to mount telephone cables to utility poles. Reference numerals 30-62 will be used to refer to elements of the first preferred embodiment of FIGS. 1 and 2, and reference numerals 70-86 will be used to refer to elements of the second preferred embodiment of FIGS. 3 and 4.

As shown in the drawings, the reference numeral 10 is used to indicate a utility pole, such as a vertically mounted pole which serves to support both power cables in an upper power zone, and communication cables in a lower communication zone. The power zone and the communication zone are in this embodiment separated by a neutral zone of 40 inches in vertical extent along the length of the pole. The pole 10 includes within the communication zone a bolt 12 which extends completely through the pole 10 and is secured in place by means of a threaded nut 16. Metal plate washers 14 are utilized at both points where the bolt 12 passes through the surface of the pole 10.

A strand clamp 20 is mounted on the bolt 12. This strand clamp 20 is made up of two clamp plates 22,24 which are secured together by clamp fasteners 26, and can for example be of the type marketed as Part No. J-1096 by Anixter-Pruzan Corp., of Elk Grove Village, Ill. The strand clamp 20 serves to clamp and secure a strand 30, which for example can be a 6.6 galvanized steel strand cable used to support a communication cable 32 such as a telephone cable. The communication cable 32 is typically lashed to the strand 30 such that the weight of the communication cable 32 is carried by the strand 30, which is in turn held in place by the strand clamp 20. As pointed out above, the elements 10-32 described above are conventional prior art structures, and they will therefore not be described in greater detail here.

According to the first embodiment of this invention shown in FIGS. 1 and 2, a support arm 40 is provided which is made up of a one-piece metal element which defines an inner vertical leg 42, a central horizontal leg 44, and an outer vertical leg 46. The inner vertical leg 42 of the support arm 40 defines an aperture which receives the end of the bolt 12. A nut 48 is threadedly secured to the bolt 12 so as simultaneously to hold the support arm 40 and the strand clamp 20 in place on the bolt 12. A metal strap 50 is provided which extends diagonally between the pole 10 and the outer vertical leg 46. This strap 50 is secured firmly to the pole 10 at its upper end by means of a drive screw 52, and it is secured to the outer vertical leg 46 at its lower end by means of a bolt 54. The bolt 54 extends through the outer vertical leg 46 and the lower end of the strap 50. In addition, the bolt 54 extends through a strand clamp 58 which is identical to the strand clamp 20 described above. A nut 56 secures the strand clamp 58 and the strap 50 to the outer vertical leg 46. The strand clamp 58 supports a strand 60 in the conventional manner, and this strand 60 supports an additional communication cable, such as a CATV cable 62, by means of conventional lashings.

In this embodiment, the support arm 40 and the strap 50 are formed of galvanized mild steel, and are shaped and dimensioned according to standard engineering principles to suit the intended application.

As shown in FIGS. 1 and 2, the support arm 40 and the strand clamp 58 support the strand 60 and the additional communication cable 62 at a point below the communication cable 32 and laterally spaced therefrom. In this way, the necessary separation between the two communication cables 32,62 is provided. Furthermore, the system shown in FIGS. 1 and 2 eliminates any obstructions below the cable 32, thereby allowing the cable 32 to be dropped and replaced in the conventional manner, without hindrance from the additional cable 62. Furthermore, since the support arm 40 and the strand clamp 20 are held in place by the same bolt 12, the support arm 40 does not extend substantially above the strand clamp 20 and does not therefore intrude into the neutral zone above the strand clamp 20. The strap 50 does extend somewhat above the strand clamp 20; however, it is positioned relatively close to the pole 10 so as to provide no substantial interference to workers working with power cables situated above the portion of the utility pole 10 shown in FIGS. 1 and 2. In some applications, the support arm 40 may provide adequate strength without the strap 50. In such cases, all intrusion into the neutral zone of the pole can be eliminated.

Another important point is that the support arm 40 provides a path of electrical conduction between the two strands 30,60. For this reason, the need for any additional electrical interconnection between the strands 30,60 is eliminated, along with the associated expense.

FIGS. 3 and 4 illustrate a second preferred embodiment of this invention. In these figures, reference numerals 10-32 have been used to designate components corresponding to the prior art components shown in FIGS. 1 and 2, and will not be described here. As shown in FIGS. 3 and 4, this second preferred embodiment includes a support arm 70 which extends horizontally from the pole 10 and is square in cross-section throughout a large portion of its length. The support arm 70 defines a threaded bore 72 sized to mate with the end of the bolt 12. Thus, by screwing the support arm 70 onto the threaded bolt 12, the support arm 70 in effect forms an extension of the bolt 12, which acts simultaneously to hold the strand clamp 20 in place against the nut 16. The support arm 70 also defines a threaded stud 74 which extends outwardly, in alignment with the bolt 12. This threaded stud 74 serves to mount a strap 76 which has a lower end secured to the threaded stud 76 by means of a nut 80, and an upper end secured to the pole 10 by means of a drive screw 78. The nut 80 also secures a strand clamp 82, which is identical to the strand clamp 20, onto the threaded stud 74. The strand clamp 82 secures a strand 84 in place to the support arm 70, and the strand 84 supports an additional communication cable 86, such as a CATV cable for example. As explained above, conventional techniques such as lashing techniques can be used to secure the second communication cable 86 to the strand 84.

In this preferred embodiment, the support arm 70 and the strap 76 are formed of mild steel and galvanized.

The second embodiment of FIGS. 3 and 4 operates similarly to the first embodiment of FIGS. 1 and 2 in that it utilizes the pre-existing bolt 12 to mount the support arm 70. However, the support arm 70 extends horizontally, and therefore the communication cable 86 is mounted at substantially the same level as the communication cable 32. The same advantages as those discussed above in conjunction with the first preferred embodiment are provided with respect to electrical interconnection between the strand 84 and the strand 30.

Both of the embodiments described above provide important advantages in terms of ease of installation and minimal intrusion into the neutral zone of the utility pole 10, above the strand clamp 20. The embodiment of FIG. 1 provides particular advantages in situations where it is important to provide a vertical offset between the two communication cables 32,62 in order to eliminate chafing therebetween. Such chafing can be a particular problem in situations where lateral loads are applied to only one of the two communication cables 32,62. The second preferred embodiment of FIGS. 3 and 4 provides particular advantages in situations where ground clearance of the communication cable 32 is near the minimum. In such situations, the communication cable 86 can be provided with substantially the same ground clearance as that of the communication cable 32, thereby eliminating the need to replace the utility pole in order to obtain increased ground clearance.

The embodiments described above can be readily and simply fabricated in a low-cost manner. They can be installed in a particularly simple and efficient manner which minimizes the need to reroute the pre-existing communication cable 32, and which minimizes intrusion into the neutral zone above the strand clamp 20. All of this is acheived without interfering with replacement or repair of the communication cable 32 from below, and without requiring the installation of additional through bolts such as the bolt 12 extending through the pole 10.

Of course, it should be understood that a range of changes and modifications to the preferred embodiments described above will be apparent to those skilled in the art. For example, the support arm 40 can be provided with an outer vertical leg which extends either upwardly or downwardly by a small amount so as to improve ground clearance of the cable 62. It is therefore intended that the foregoing detailed description be regarded as illustrative rather than limiting, and that it be understood that it is the following claims, including all equivalents, which are intended to define the scope of this invention.

We claim:

1. In combination with a cable support pole of the type comprising a fastener extending through the pole, a first strand clamp mounted by the fastener to the pole, and a first communication cable supporting strand secured by the first strand clamp, the improvement comprising:

a one-piece, integral support bar comprising a central horizontal leg, an inner vertical leg secured at one end of the horizontal leg, and an outer vertical leg secured at the other end of the horizontal leg, said inner vertical leg defining a first horizontally oriented opening sized to receive the fastener such that the inner vertical leg is secured to the pole by the fastener and the horizontal leg extends substantially no higher than the first strand clamp, said outer vertical leg defining a second horizontally oriented opening;

a second strand clamp comprising a fastener passing through the second horizontally oriented opening to secure the second strand clamp to the outer vertical leg at a point laterally spaced from and below the first strand clamp, said second strand clamp adapted to secure a second communication cable supporting strand in place laterally spaced from and below the first communication cable supporting strand.

2. The invention of claim 1 further comprising a brace having an upper end secured to the pole at a point above the fastener and a lower end secured to the outer vertical leg, said brace extending diagonally between the pole and the support bar to support the support bar against downward loads applied to the second strand clamp.

3. The invention of claim 1 wherein the support bar is dimensioned such that the vertical separation between the first and second strands is substantially as great as the lateral separation between the first and second strands.

* * * * *